United States Patent [19]

Yoshida et al.

[11] Patent Number: 5,767,632
[45] Date of Patent: Jun. 16, 1998

[54] CRT DISPLAY DEVICE

[75] Inventors: Moritoshi Yoshida, Ridgewood, N.J.; Tomohiko Douken; Hidefumi Antoku, both of Hitachi, Japan

[73] Assignee: Hitachi, Ltd., Tokyo, Japan

[21] Appl. No.: 508,938

[22] Filed: Jul. 28, 1995

[30] Foreign Application Priority Data

Aug. 4, 1994 [JP] Japan .................. 6-182677

[51] Int. Cl.$^6$ .................. G09G 1/04; H04N 3/22
[52] U.S. Cl. .................. 315/370; 348/806
[58] Field of Search .................. 315/370, 371, 315/382, 382.1; 348/806

[56] References Cited

U.S. PATENT DOCUMENTS

| 4,887,010 | 12/1989 | Fujimura | 315/370 |
| 5,315,310 | 5/1994 | Eagle et al. | 345/14 |
| 5,430,502 | 7/1995 | Yamazaki et al. | 348/806 |
| 5,440,353 | 8/1995 | Yamazaki et al. | 348/806 |

FOREIGN PATENT DOCUMENTS

| 63-275284 | 11/1988 | Japan . |
| 4-276789 | 10/1992 | Japan . |

*Primary Examiner*—Gregory C. Issing
*Attorney, Agent, or Firm*—Kenyon & Kenyon

[57] ABSTRACT

A horizontal synchronizing frequency $f_H$ and a vertical synchronizing frequency $f_V$ are detected, a moire adjusting signal ($af_H + bf_V$) is calculated, and then the position of displayed picture is alternatingly shifted in the horizontal direction by the distance proportional to ($af_H + bf_V$) every cycle of the vertical synchronizing frequency. Therein, a and b are coefficients depending on the CRT display device.

1 Claim, 4 Drawing Sheets

CRT DISPLAY DEVICE

BACKGROUND OF THE INVENTION

The present invention relates to a CRT display device of multi-scan type, and more particularly relates to a CRT display device suitable for correcting moire, especially, automatically adjusting moire at minimum independently of horizontal and vertical synchronizing frequencies.

In a CRT display device, diameter of a beam spot is made tiny in order to sharpen a picture. However, since there is a shadow mask in a CRT, a series of light and dark patterns called as moire are apt to appear. The contrast of the light and dark patterns in the moire is suddenly intensified when the diameter of the beam spot becomes smaller than the pitch of shadow mask holes.

A method is disclosed in Japanese Patent Application Laid-Open No. 63-275284 (1988), where landing positions of the electron beam to a shadow mask are slightly shifted in the lateral direction every other frame of displayed picture to decrease the moire. That is, the moire adjusting is performed by providing a phase control circuit in front of a horizontal deflection circuit in order to shift the position of the picture in the horizontal direction, adjusting output of a flip-flop (F/F) using a moire adjusting VR, the output of the flip-flop being alternatingly switched "1" or "0" every cycle of the vertical frequency corresponding to the frame frequency, applying the adjusted signal to the phase control circuit.

Most of recent CRT display devices of multi-scan type are capable of coping with plural horizontal and vertical synchronizing frequencies. These CRT display devices automatically and properly control the size and the position of pictures every horizontal and vertical synchronizing frequencies. However, since the moire relates to the resolution, a user often adjusts the moire depending on the user's preference on resolution and pattern.

However, in the conventional technology disclosed in Japanese Patent Application Laid-Open No. 63-275284 (1988), there is a problem in that since the amount of shift of beam landing position is always constant, the moire cannot be decreased due to shortage of the amount of shift under some synchronizing frequency or the moire becomes as jitter of a picture due to excess of the amount of shift.

SUMMARY OF THE INVENTION

An object of the present invention is to provide a CRT display device which is capable of always decreasing and adjusting the moire properly in various synchronizing frequencies.

The present invention to solve the above problem is characterized by setting a moire adjusting amount in proportion to each amount of the horizontal synchronizing frequency $f_H$ and the vertical synchronizing frequency $f_V$ in the side of the CRT display device.

The object of the present invention can be attained by calculating the moire adjusting amount $(af_H+bf_V)$ described above, where a and b are coefficients for the CRT display device, and by alternatingly shifting the position of displayed picture in the horizontal direction by a distance proportional to the amount of $(af_H+bf_V)$ every cycle of the vertical synchronizing frequency. That is, the landing position in the horizontal direction of the electron beam to the holes of shadow mask of the CRT is alternatingly shifted by a distance proportional to the amount of $(af_H+bf_V)$ every frame of displayed pictures.

DETAILED DESCRIPTION OF THE PREFERRED EMBODIMENTS

Figure 1:
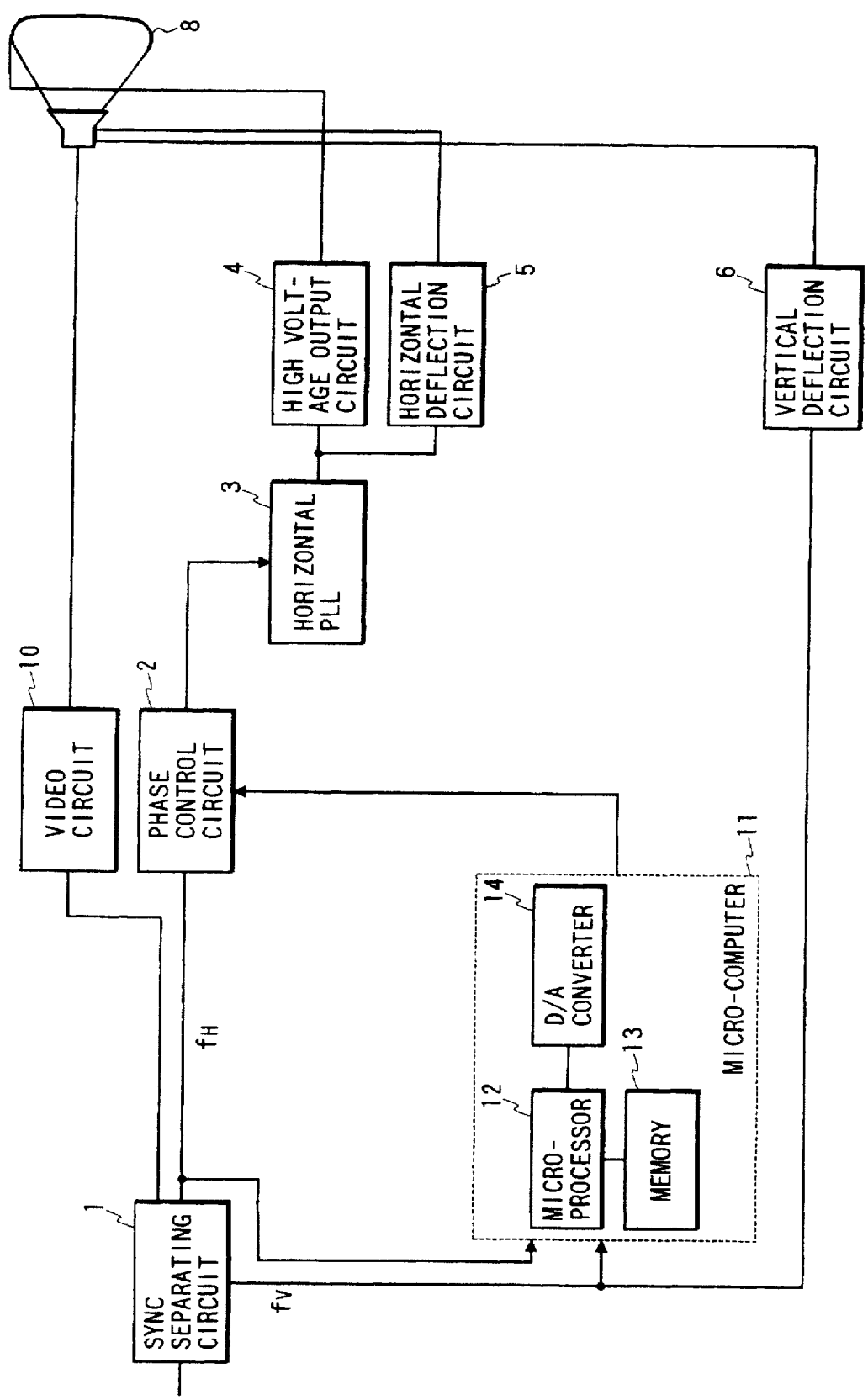
FIG. 1 is a block diagram of an embodiment in accordance with the present invention.

The preferred embodiments will be described in detail below, referring to the accompanying drawings. Initially, the reference characters will be described. The reference character 1 indicates synchronization separating circuit, the reference character 2 indicates a phase control circuit, the reference character 3 indicates a horizontal PLL, the reference character 4 indicates a high voltage output circuit, the reference character 5 indicates a horizontal deflection circuit, the reference character 6 indicates a vertical deflection circuit, the reference character 7 indicates a flip-flop, the reference character 8 indicates a CRT device, the reference character 9 indicates a moire adjusting variable resistor, the reference character 10 indicates a video circuit, the reference character 11 indicates a micro-computer, the reference character 12 indicates a micro-processor, the reference character 13 indicates a memory, the reference character 14 indicates a D/A converter, the reference character 15 indicates an F/V converter, the reference character 16 indicates a multiplying circuit, and the reference character 17 indicates an adding circuit.

FIG. 1 is a block diagram of an embodiment of a CRT display device in accordance with the present invention.

In FIG. 1, the synchronization separating circuit 1 separates a input signal into a horizontal synchronizing signal, a vertical synchronizing signal and a video signal. The video signal is input to the video circuit 10. The horizontal synchronizing signal is input to the phase control circuit 2. The output of the phase control circuit 2 is input to the high voltage output circuit 4 and the horizontal deflection circuit 5 through the horizontal PLL circuit 3. The vertical synchronizing signal is input to the vertical deflection circuit 6.

The CRT device 8 displays a picture based on the outputs of the video circuit 10, the high voltage output circuit 4, the horizontal deflection circuit 5 and the vertical deflection circuit 6.

The micro-computer 11 performs the following calculation using the horizontal synchronizing signal and the vertical synchronizing signal, and supplies a voltage V for adjusting the horizontal position of a picture increased or decreased corresponding to the horizontal deflection frequency and the vertical deflection frequency of the phase control circuit 2. $f_H$ is the horizontal deflection frequency, $f_V$ is the vertical deflection frequency, and a and b are proportional coefficients determined by the shadow mask pitch of the CRT and so on.

That is, a has a value of ½ of the shadow mask pitch in the horizontal direction of the CRT. b has a value of ½ of the shadow mask pitch in the vertical direction of the CRT.

The micro-processor 12 in the micro-computer 11 executes the following equation (1), and the D/A converter 14 converts the calculated result into an analog signal to output a voltage V for adjusting horizontal position. The memory 13 stores the above $f_H$, $f_V$, a, b, and the other parameters (mask pitch and so on).

$$V = af_H + bf_V \quad (1)$$

Figure 2A:
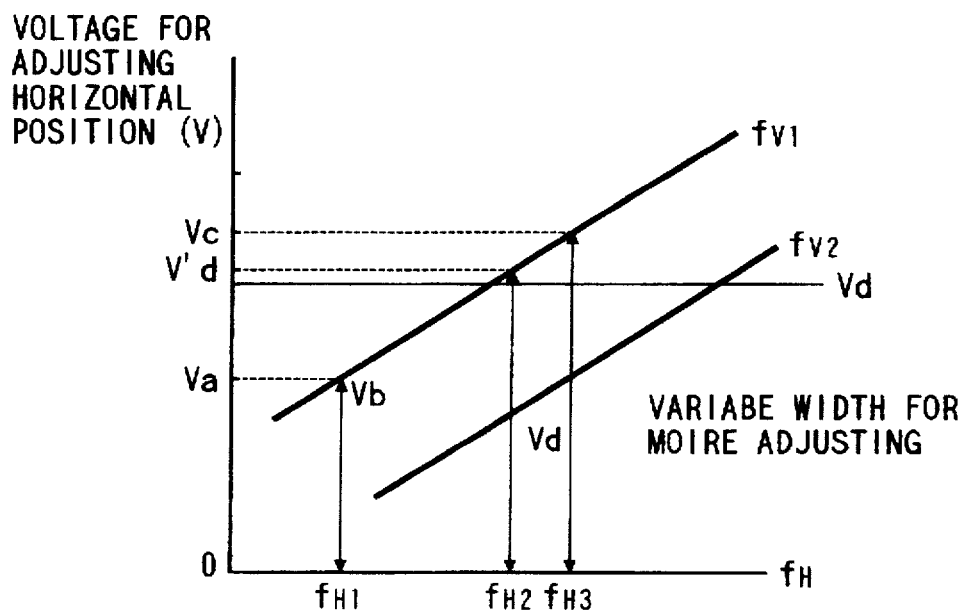
FIG. 2 A and B characteristic graphs of moire adjusting voltage in accordance with the present invention.
Figure 2B:
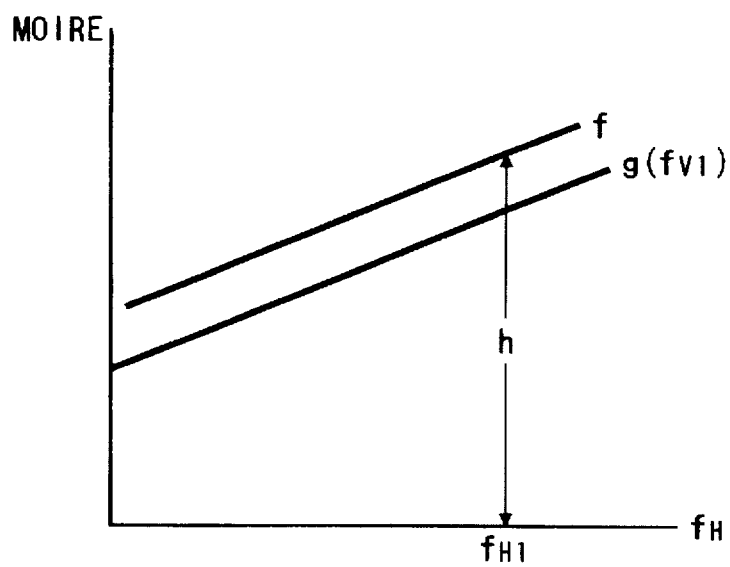

FIG. 2 is graphs showing the relationships between the voltage V for adjusting horizontal position and the horizontal synchronizing frequency and the vertical synchronization frequency.

In FIG. 2 (a), for example, when the horizontal deflection frequency is $f_H$ and the vertical deflection frequency is $f_V$, the voltage V for adjusting horizontal position becomes $V_a$. In this case, when the horizontal deflection frequency is changed to $f_{H3}$, the voltage V for adjusting horizontal position becomes $V_c$.

When the vertical deflection frequency is changed from $f_{V1}$ to $f_{V2}$ the voltage V for adjusting horizontal position changes corresponding to the change in the vertical deflection frequency.

The magnitude of the voltage V for adjusting horizontal position in the conventional technology disclosed in Japanese Patent Application Laid-Open No. 63-275284 (1988) is a constant as shown by $V_d$ in FIG. 2 (a) independently of the horizontal and the vertical deflection frequencies.

That is, in FIG. 2 (a), $V_a$ expresses the voltage for adjusting horizontal position when the horizontal deflection frequency is $f_{H1}$ and the vertical deflection frequency is $f_{V1}$, and the variable range (from 0 to $V_a$) is expressed by $V_b$. In the figure, $V_d$ expresses the horizontal line, that is, a constant value of the voltage for adjusting horizontal position independently of $f_H$ and $f_V$. $V_C$ expresses the voltage for adjusting horizontal position when the horizontal deflection frequency is $f_{H3}$ and the vertical deflection frequency is $f_V$. $V_d$ is within a constant variable range of the voltage for adjusting horizontal position independently of $f_H$ and $f_V$. As described above, in a case where the variable range of the voltage for adjusting horizontal position is constant, when, for example, the horizontal deflection frequency is $f_{H2}$ and the vertical deflection frequency is $f_V$ the voltage V for adjusting horizontal position is insufficient and consequently the moire adjusting cannot be performed sufficiently. That is, when the horizontal deflection frequency is $f_{H2}$ and the vertical deflection frequency is $f_{V1}$, the voltage for adjusting horizontal position of $V_d'$ is required and the moire adjusting cannot be sufficiently performed with the constant voltage of $V_d$.

In FIG. 2 (b), the straight line g in the figure is a straight line expressing the voltage for adjusting horizontal position capable of minimizing the moire when the vertical deflection frequency is $f_{V1}$ and the horizontal deflection frequency is $f_H$. Here, "moire minimum" is defined by a state where an observer cannot visually detect the moire which appears when a series of light and dark pattern picture having a fine pitch is displayed on a screen.

Actually, by setting the voltage output from the microcomputer 11 to the straight line f higher than the straight line g, it is possible to give a margin to the variable width of the voltage for adjusting horizontal position to adjust the moire. In other words, the straight line g is set higher than a point where the moire becomes minimum, a margin is given to the variable width of the moire adjusting so that a user can easily detect the minimum point even if the moire cannot be decreased to 0 (zero).

Further, it is possible to obtain the voltage for adjusting horizontal position having a margin to the wide range of the horizontal deflection frequency and to the wide range of the vertical deflection frequency.

For instance, in a case where $f_H$=80 kHz and the voltage for adjusting horizontal position is 5 V, the horizontal shift of the beam landing position becomes 0.2 mm. And when $f_H$=30 kHz and the voltage for adjusting horizontal position is 1 V, the horizontal shift of the beam landing position becomes 0.2 mm.

There is an experimental result where, in a case of the CRT dot pitch (shadow mask pitch) of 0.3 mm, the amount of shift capable of distinguishing or minimizing the moire is 0.15 mm which is one-half of the dot pitch. Therefore, it is possible to distinguish or minimize the moire in the both cases of $f_H$ of 80 kHz and 30 kHz.

On the other hand, if the voltage for adjusting horizontal position is set constant, for example, 2.5 V independently of $f_H$, the amount of horizontal shift of the beam landing position becomes 0.1 mm when $f_H$=80 kHz. However, since in a case of the CRT dot pitch of 0.3 mm, the amount of horizontal shift required for extinguishing the moire is 0.15 mm, that is, one-half of the dot pitch, the amount of horizontal shift of 0.1 mm is insufficient and difficult to adjust the horizontal position.

Figure 3:
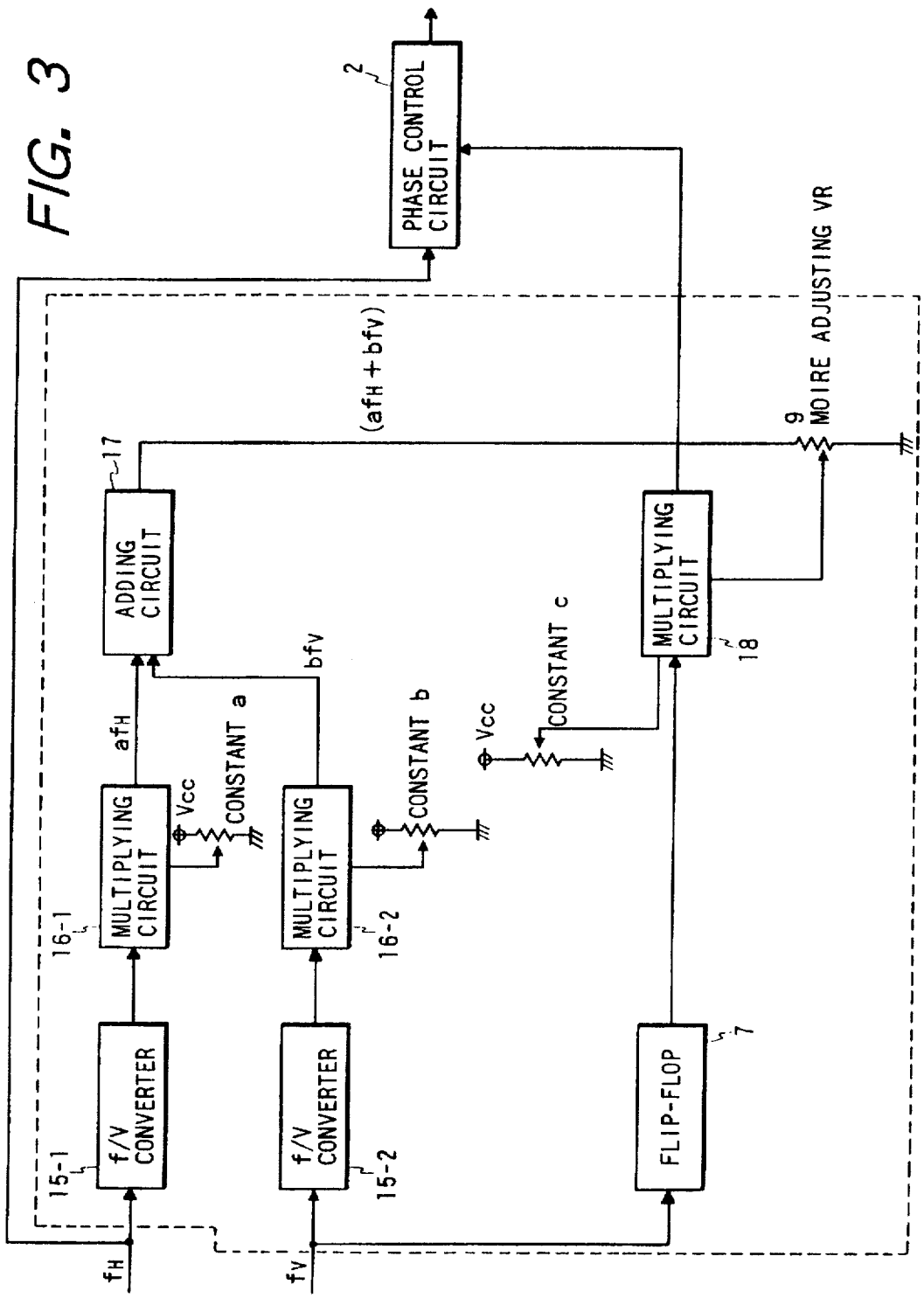
FIG. 3 is a block diagram of another embodiment in accordance with the present invention.

FIG. 3 is a block diagram of an embodiment in accordance with the present invention where functions executed by the micro-computer 11 are replaced with individual circuits. A horizontal deflection frequency $f_H$ output from the synchronization separating circuit 1 of FIG. 1 is converted into a voltage by an f/V converter 15-1, and multiplied by a coefficient a by a multiplying circuit 16-1 to output a voltage proportional to $af_H$. Similarly, a vertical deflection frequency $f_V$, is converted into a voltage by an f/V converter 15-2, and multiplied by a coefficient b by a multiplying circuit 16-2 to output a voltage proportional to $bf_V$.

An adding circuit 17 adds the above voltages proportional to $af_H$ and $bf_V$ to produce an output $(af_H+bf_V)$ shown by the equation (1), and a moire adjusting VR (variable resistor) 9 adjusts the level of the $(af_H+bf_V)$. That is, the input voltage is varied into a voltage in the range of min0–$(af_H+bf_V)$ by moving the moire adjusting VR. Since a flip-flop (F/F) 7 outputs 0 and 1 corresponding to $f_V$, the output becomes (moire adjusting VR)×C. Where the maximum value of the (moire adjusting VR) is $(af_H+bf_V)$. The C is a correction value for correcting the output from the flip-flop (F/F) 7 so as to become "0" and "1". Using the moire adjusting VR, the voltage for adjusting horizontal position can be adjusted within the range of 0 to $(af_H+bf_V)$ so that the moire is minimized with observing the screen under a certain frequency even if the output of the moire changes depending on a CRT. The output of a multiplying circuit 18 is switched with the output level of the flip-flop (F/F) 7 which is alternatingly switched "1" or "0" every cycle of the vertical frequency. That is, when the output of the flip-flop (F/F) 7 is "0", the beam landing position is in a normal landing position. And when the output of the flip-flop (F/F) 7 is "1", the beam landing position is shifted in the horizontal direction by an amount corresponding to the voltage V for adjusting horizontal position from the normal beam landing position.

The multiplying circuit 18 controls the output level of the flip-flop (F/F) 7 alternatingly switched "1" or "0" every cycle of the vertical frequency using the output signal of the moire adjusting VR 9, and the output is applied to a phase control circuit 2 to perform the positional adjustment in the horizontal direction on the screen.

Referring to a flow chart shown in FIG.4, a description of an embodiment according to the present invention which is capable of automatically setting a width of moire adjusting voltage similar to the above by generating a horizontal synchronizing frequency and a vertical synchronizing frequency inside a CRT display device will be made.

Figure 4:
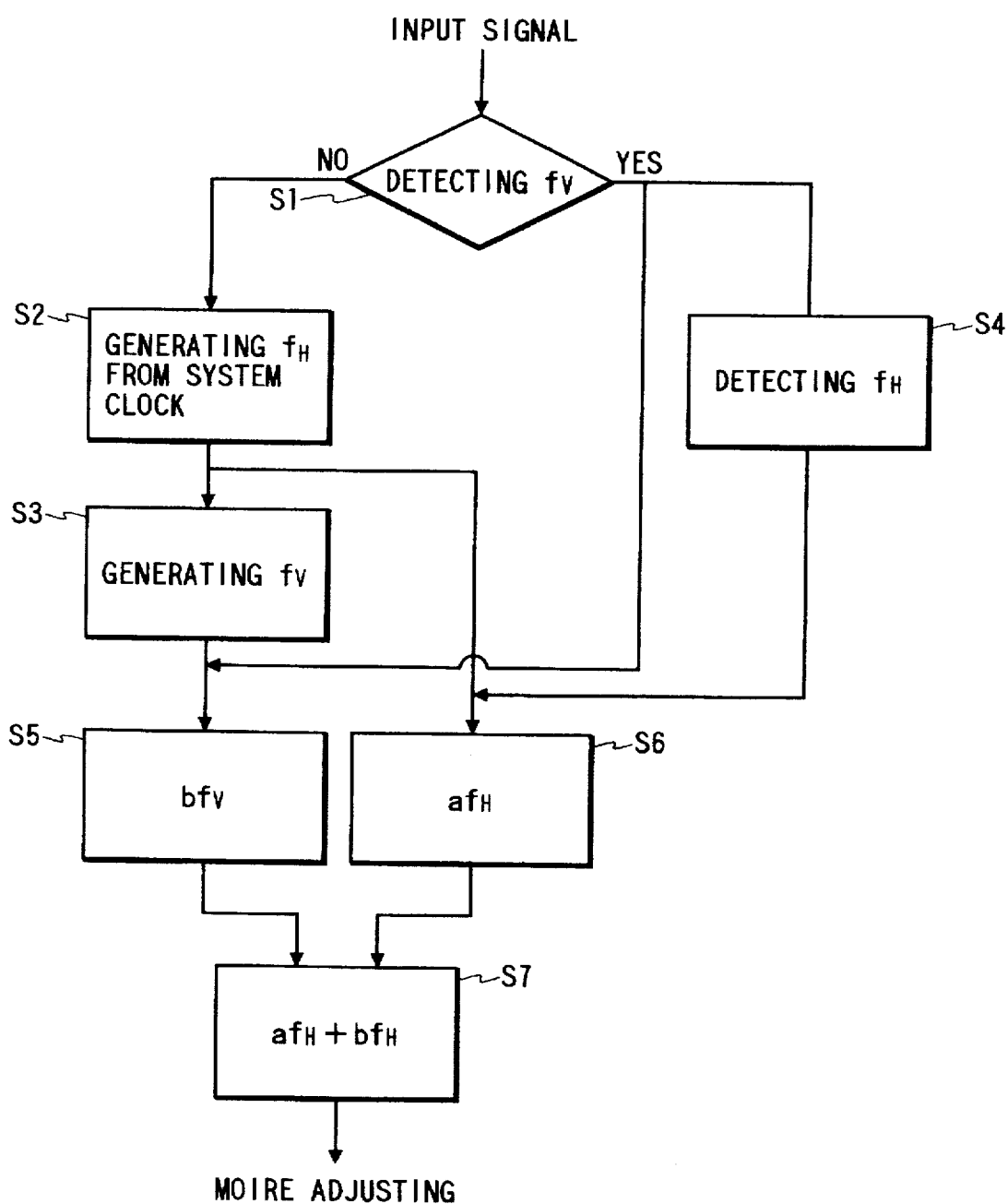
FIG. 4 is a flow chart of an embodiment in accordance with the present invention.

In FIG.4, in step S1, presence or absence of the vertical frequency $f_V$ in the input signal (namely, synchronizing signal) is detected. In more detail, presence or absence of $f_V$ is detected with presence or absence of an interruption by inputting a vertical synchronizing signal to a port of the micro-computer to execute interruption with the vertical synchronizing signal. If $f_V$ is not detected, the processing go to step S2 to produce the horizontal synchronizing frequency $f_H$ from a system clock. In more detail, $f_H$ is produced by measuring the number of horizontal signals coming during a period of a clock made by dividing the system clock and performing calculation using the period of the system clock. In step S3, $f_V$ is produced using the $f_H$. In more detail, assuming that line number is 1024 when $f_H$ is between 45 kHz to 60 kHz, $f_V = f_H/1024$. Assuming that line number is 1280 when $f_H$ is above 60 kHz, $f_V = f_H/1280$. Assuming that line number is 640 when $f_H$ is below 45 kHz, $f_V = f_H/640$.

If the vertical synchronizing frequency $f_V$ is detected in step S1, $f_H$ is detected in step S4.

Then, in steps S5 and S6, $af_H$, and $bf_V$ are calculated using the above $f_H$ and $f_V$ respectively, and $(af_H + bf_V)$ is calculated in step S7. The result is used as the moire adjusting signal. That is, instead of using the output voltage of the adding circuit 17 in FIG.3, the calculated result is used by converting to a voltage with the D/A converter.

The characteristic of the present invention can provide a CRT display device capable of properly setting a moire adjusting range corresponding to the horizontal and vertical frequencies.

Further, in the present invention, there is no complex display system containing an image recognition device to detect the moire within the display system itself.

In the present invention, the range within which a user can properly adjust the moire can be automatically set from the display side. The user is satisfied with his desire to adjust by himself and his own preference even if it is not in an optimum condition.

Further, in the present invention, the adjusting voltage value can be set according to the user's preference up to the minimum point where the moire is minimized within the variable range.

In a case where the adjusting width capable of properly adjusting the moire is fixed as in the conventional technology, it is required to cover a very wide adjusting range in order to cope with various conditions. However, since the user does not know where an optimum position is in the very wide adjusting range, easiness of use is decreased.

In the present invention, since the upper limit of the adjusting range for minimizing the moire is set in the display side, the user can adjust to his preferred display quality within the range.

What is claimed is:

1. A CRT display device of the multi-scan type that correspond to a plurality of synchronizing frequencies comprising:

a) moire adjustment value circuit outputting a moire adjustment value for adjusting a horizontal positioning every cycle of a vertical synchronizing frequency including:

i.) a first circuit having as inputs, a magnitude of a horizontal synchronizing frequency and a coefficient a and providing as an output a voltage proportional to the magnitude of said horizontal synchronizing frequency; and ii.) a second circuit having as inputs, a magnitude of a vertical synchronizing frequency and a coefficient b and providing as an output a voltage proportional to said vertical synchronizing frequency, wherein said coefficient a and said coefficient b are determined by a shadow mask pitch; and wherein said outputs are used to provide a maximum voltage value from which said moire adjustment value is determined;

b) a phase control circuit shifting a phase of said horizontal synchronizing frequency according to said moire adjustment value;

c) a horizontal deflection circuit scanning an electron beam horizontally in response to an output signal from said phase control circuit; and d) a vertical deflection circuit scanning said electron beam vertically.

* * * * *

UNITED STATES PATENT AND TRADEMARK OFFICE
CERTIFICATE OF CORRECTION

PATENT NO. : 5,767,632
DATED : 16 June 1998
INVENTOR(S) : Moritoshi Yoshida et al.

It is certified that error appears in the above-identified patent and that said Letters Patent is hereby corrected as shown below:

| Column | Line | |
|---|---|---|
| 2 | 55 | After "circuit 2." start new paragraph and change "$f_{H.}$ is" to --$f_H$ is--. |
| 3 | 7 | Change "$f_H$" to --$f_{H1}$--; change "$f_V$" to --$f_{V1}$--. |
| 3 | 35 | Change "$f_V$" to --$f_{V1}$--. |
| 4 | 20 | After "circuits." start new paragraph. |
| 4 | 30 | After "by" delete "the". |

Signed and Sealed this

Sixteenth Day of March, 1999

Attest:

Attesting Officer

Q. TODD DICKINSON

Acting Commissioner of Patents and Trademarks